(12) United States Patent
Blanchard et al.

(10) Patent No.: US 7,401,262 B2
(45) Date of Patent: Jul. 15, 2008

(54) METHOD AND APPARATUS FOR A LOW-LEVEL CONSOLE

(75) Inventors: Anton Blanchard, Marrickville (AU); Milton Devon Miller, II, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/912,504

(22) Filed: Aug. 5, 2004

(65) Prior Publication Data

US 2006/0031723 A1 Feb. 9, 2006

(51) Int. Cl.
*G06F 11/00* (2006.01)
(52) U.S. Cl. .......................... 714/46; 709/209
(58) Field of Classification Search ............. 714/57, 714/46; 707/208, 209
See application file for complete search history.

(56) References Cited

U.S. PATENT DOCUMENTS 6,484,273 B1* 11/2002 Chang ..................... 714/30

2003/0046610 A1* 3/2003 Yamamoto et al. ............ 714/34
2003/0126320 A1* 7/2003 Liu et al. ..................... 710/22

OTHER PUBLICATIONS

"IEEE Standard Test Access Port and Boundary-Scan Architecture", IEEE Std 1149.1-2001, published 2001, p. 1, 33-36.*
Whetsel, L. "A Proposed Standard Test Bus and Boundary Scan Architecture", published Oct. 3-5, 1988.*
Huang, et al. "A Retargetable Embedded In-Circuit Emulation Module for Microprocessors", published Jul./Aug. 2002.*

* cited by examiner

*Primary Examiner*—Scott Baderman
*Assistant Examiner*—Kevin D Scarbery
(74) *Attorney, Agent, or Firm*—Duke W. Yee; Diana R. Gerhardt; Lisa L. B. Yociss

(57) ABSTRACT

A method, apparatus and computer instructions for interfacing with an operating system on a data processing system. Registers in a processor are allocated for use in providing a low-level console interface to a remote data processing system, wherein the registers are accessed by the remote data processing system using the low-level console interface. Data is exchanged with the remote data processing system through the low-level console interface. Also, multiple channels may be multiplexed through this low-level console interface.

5 Claims, 10 Drawing Sheets

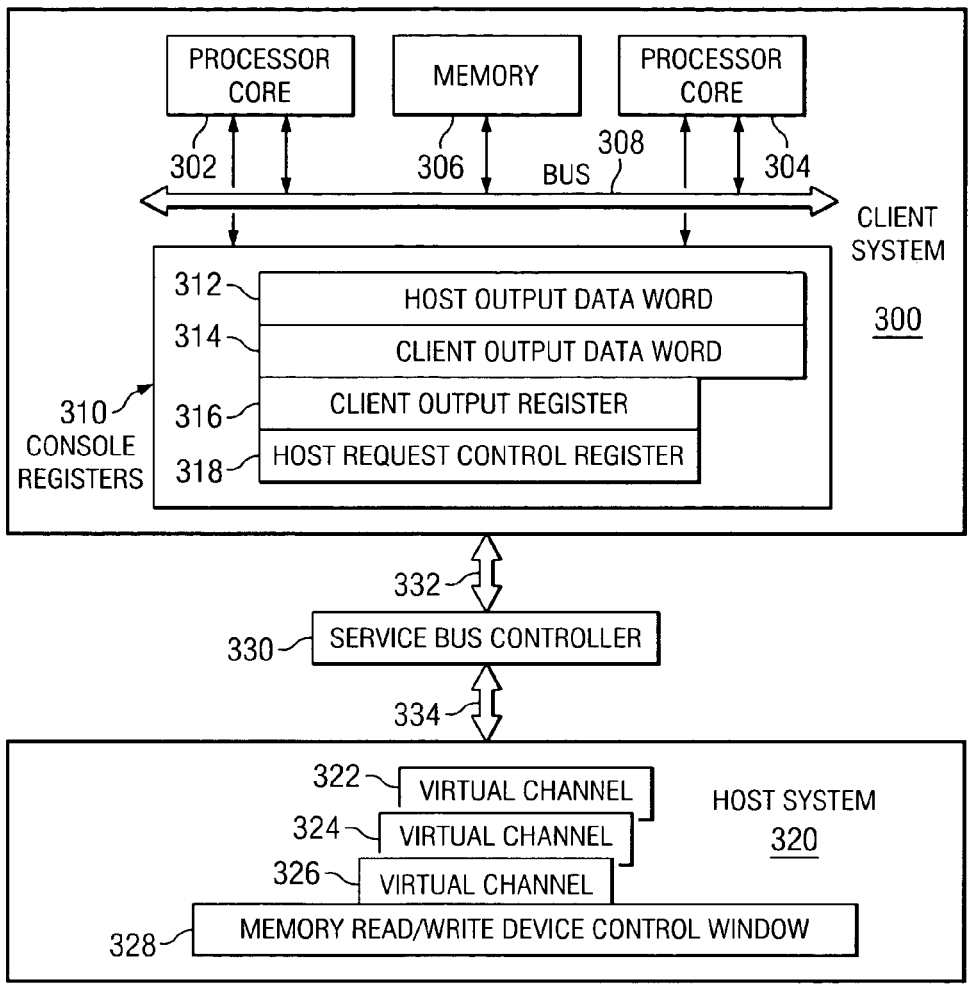

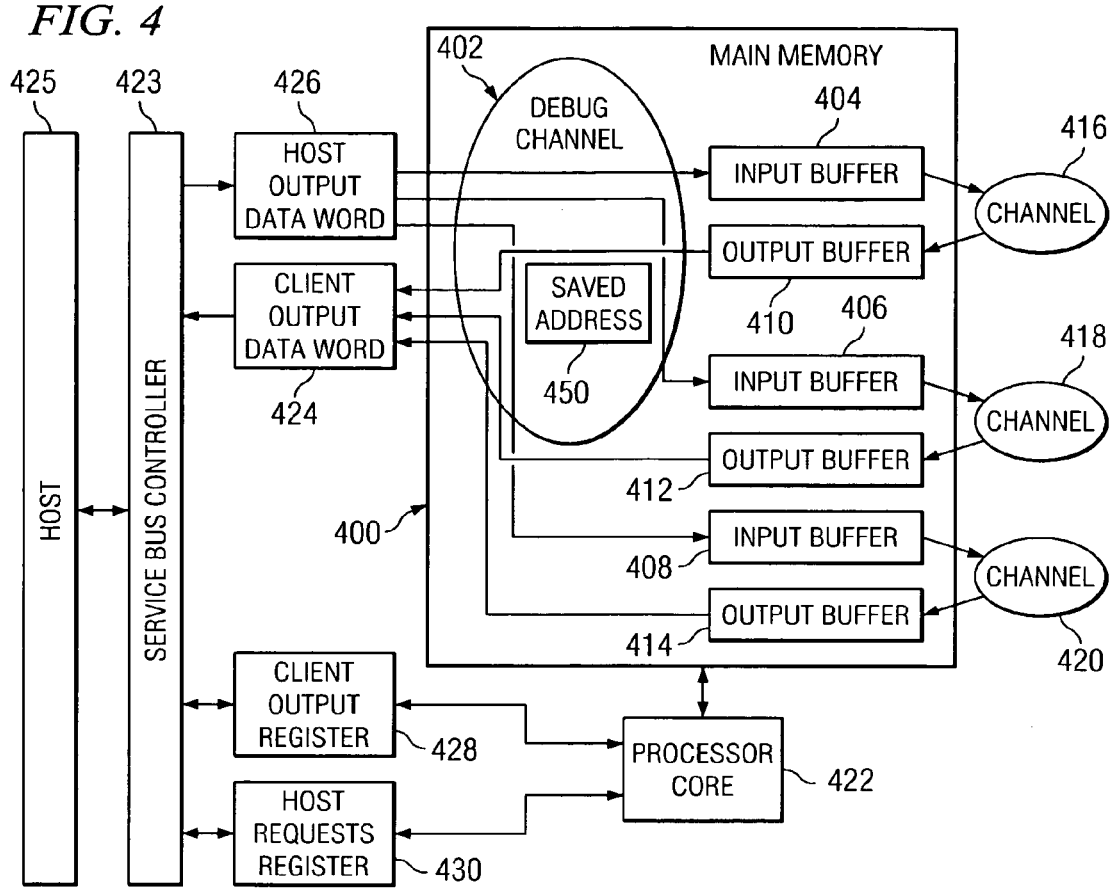
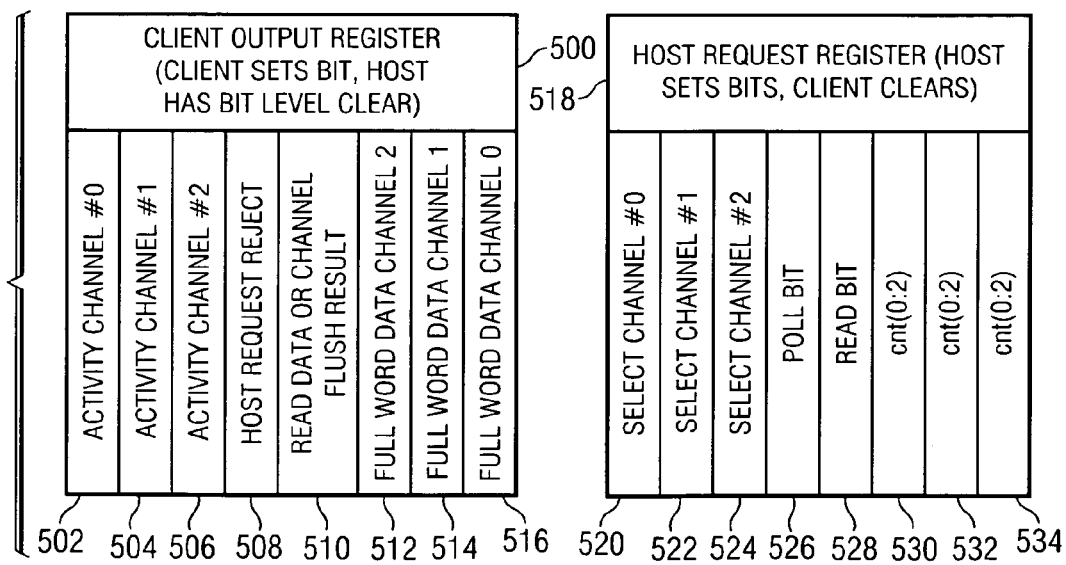

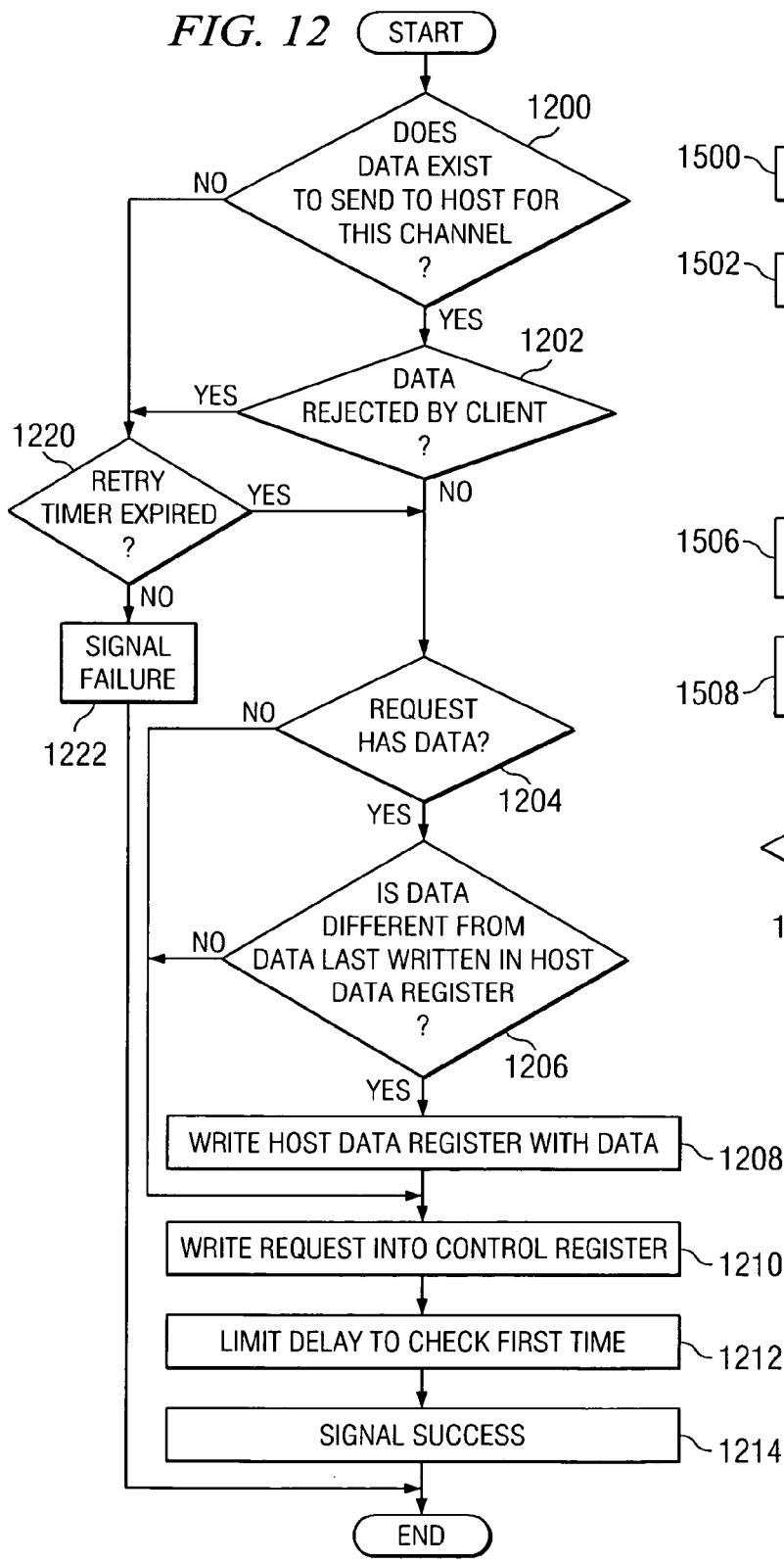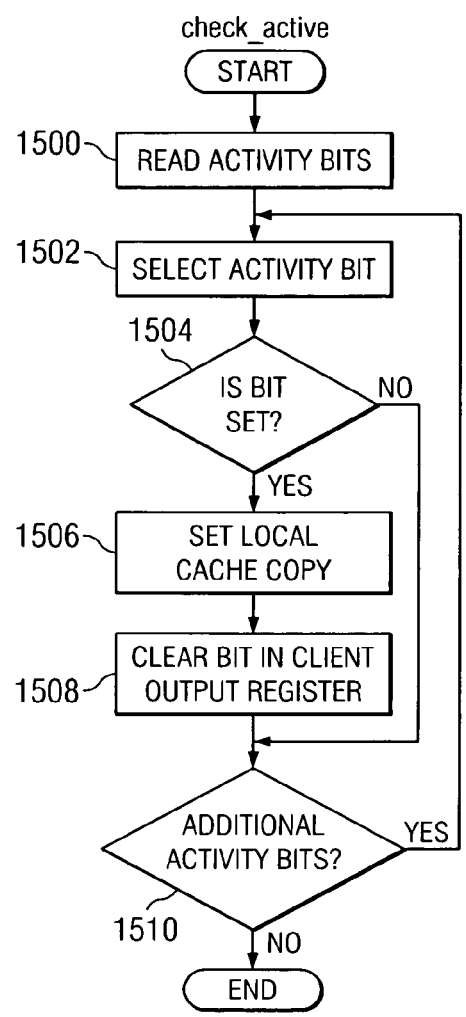

```
check_incoming:
    read/cache client output reg
    if reject is set
        mark last request rejected, schedule retry
        ack reject by clearing bit                    1600
    for each channel
        if its bit is set
            retrieve output data word
            send word to channel output for display
            clear channel bit
            tell flush fsm data was received
            limit delay to data obtained time
push_one:
    if data exists to send to host for this channel
    and it has not been rejected by the client
    or the retry timer has expired
        if the transaction has data
            update host data reg if different from
                last written data
        write the request into the control register
        limit delay to first check time
check_outgoing:
    foreach maint, 0, 1, 2, ... maint do
        (maintenance for read and write, and is given highest priority)
        call push_one
        break loop if successful
check_pending:
    if a request was sent since the last noted clear
        read host request register
        if client has not cleared
            then set max delay to busy wait check time
        else
            notify channel input has been accepted
                (channel will enable check for next chunk)
main loop:
    wait until
        the max delay until the next poll
            (reduced when successful input or output occur)
        for a channel to signal data chunk available
        or a retry timeout to expire
    (delay is limited based on current state of machine)
        grab a chunk (upto a word) of data for any channel that
            has not previously done so.
    set delay to default idle
    call check_pending
    if nothing pending
        call check_outgoing
    call check_incoming
    call check_pending (again)
    if nothing pending
        call try_flush
    repeat (main loop)

try_flush:
    if output was received
        do a general poll
        set state to channels polled
```

*FIG. 16*

METHOD AND APPARATUS FOR A LOW-LEVEL CONSOLE

BACKGROUND OF THE INVENTION

1. Technical Field

The present invention relates generally to an improved data processing system and in particular to a method and apparatus for processing data. Still more particularly, the present invention relates to a method, apparatus, and computer instructions for a console interface to a data processing system.

2. Description of Related Art

Consoles are often used to access data processing systems from a remote location. For example, many logically partitioned data processing systems are accessed remotely through another data processing system that serves as a console. The console is used to monitor a data processing system as well as to set parameters and initiate the execution of various processes. A console is often connected to the data processing system through a network connection, such as an Ethernet or through a standard serial console interface. Both types of interfaces require additional hardware to exist and function in the data processing system that is being monitored or controlled before the console may be used to access the data processing system.

For example, with an Ethernet connection, I/O bridges and at least an ethernet adapter are required to be up and running before the data processing system may be accessed through a console. The use of a serial console interface requires a serial port and various I/O components in the I/O subsystem to be up and running before the data processing system may be accessed. As a result, if a failure in the I/O subsystem or in another component, such as an Ethernet adapter or a serial port occurs, the console will be unable to access the data processing system.

This situation also is undesirable with respect to system simulation. System simulations may take large amounts of resources to simulate an I/O subsystem with the processor or may require special code that would not be available in the actual product. Additionally, having to initialize the I/O subsystem and take into account those components during testing of internal processor components also is undesirable.

Therefore, it would be advantageous to have an improved method, apparatus, and computer instructions for a console that can access a data processing system even when a number of components in the data processing system have not been initialized or have failed.

SUMMARY OF THE INVENTION

The present invention provides a method, apparatus and computer instructions for interfacing with an operating system on a data processing system. Registers in a processor are allocated for use in providing a low-level console interface to a remote data processing system. The registers are accessed by the remote data processing system using the low-level console interface. Data is exchanged with the remote data processing system through the low-level console interface. Also, multiple channels may be multiplexed through this low-level console interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used in a low-level console in accordance with a preferred embodiment of the present invention;

FIG. 4 is a diagram illustrating components for a low-level console implementation in accordance with a preferred embodiment of the present invention;

FIG. 5 is a diagram illustrating fields within a client output register and a host request control register in accordance with a preferred embodiment of the present invention;

FIG. 6 is a table indicating requests that occur based on the setting of different bits in accordance with a preferred embodiment of the present invention;

FIG. 12 is a flowchart of a push_one routine in accordance with a preferred embodiment of the present invention;

FIG. 15 is a flowchart of a check active routine in accordance with a preferred embodiment of the present invention; and FIG. 16 is a diagram illustrating code for a JTAG based low-level console on the host side in accordance with a preferred embodiment of the present invention.

DETAILED DESCRIPTION OF THE PREFERRED EMBODIMENT

Figure 1:
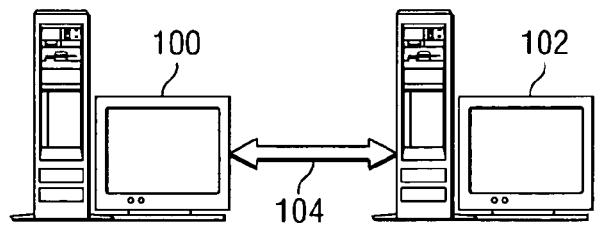
FIG. 1 is a diagram illustrating a system for a low-level console in accordance with a preferred embodiment of the present invention.

With reference now to the Figures and in particular with reference to FIG. 1, a diagram illustrating a system for a low-level console is depicted in accordance with a preferred embodiment of the present invention. A low-level console is a console that employs a direct connection to a chip or processor core without requiring I/O subsystem components, such as an I/O controller or I/O bridge. In this example, data processing system 100 may act as a console and access data processing system 102 through data link 104. In these examples, data link 104 does not require a connection to components, such as an Ethernet adapter, a serial bus connector, or input/output (I/O) subsystem components, such as an I/O bridge or I/O controller.

The mechanism of the present invention provides an improved method, apparatus, and computer instructions for a low-level console. The mechanism of the present invention connects data link 104 directly to the processor in data processing system 102. In these illustrative examples, a Joint Test Action Group (JTAG) interface is used to access data processing system 102. Of course, any serial interface or other interface that provides for data transfer with a processor or core and avoids the need for other I/O subsystem components may be used in accordance with a preferred embodiment of the present invention.

Figure 2:
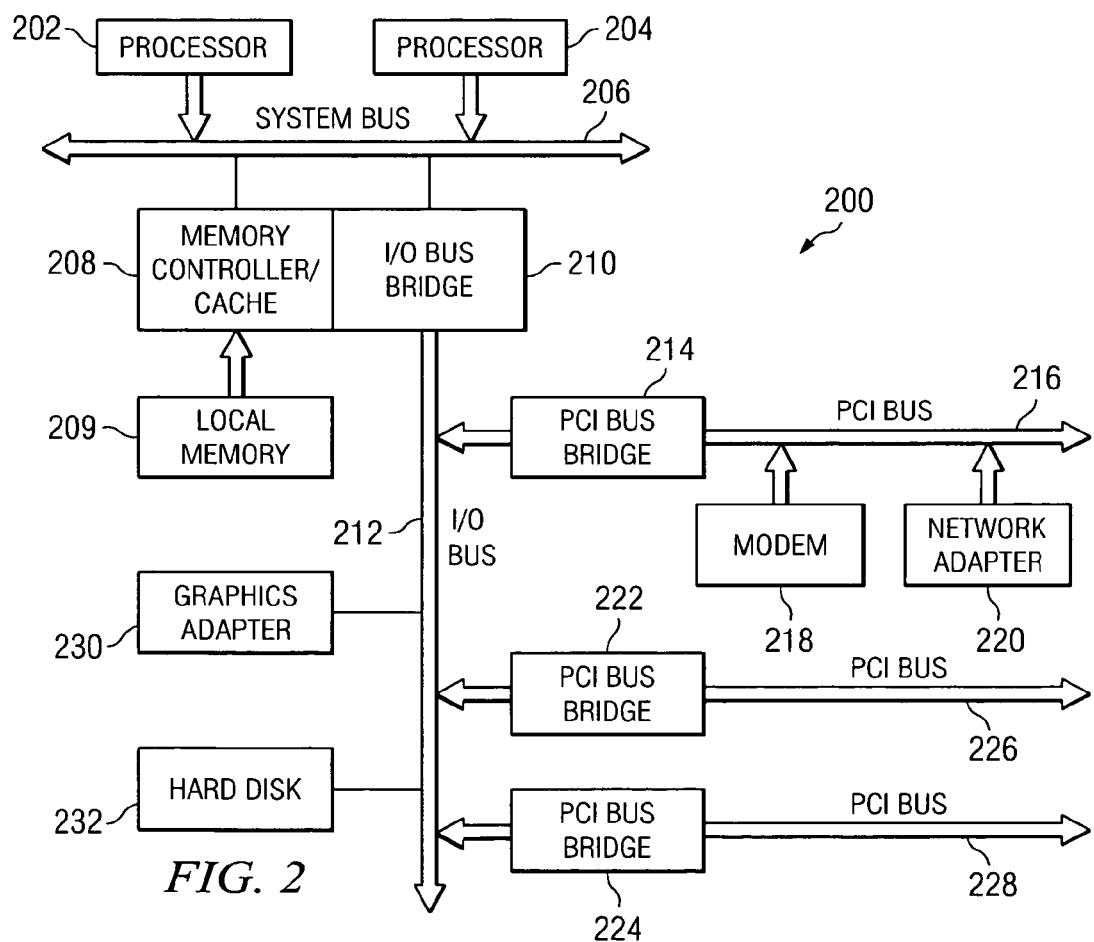
FIG. 2 is a block diagram of a data processing system that may be implemented as a server in accordance with a preferred embodiment of the present invention.

Referring to FIG. 2, a block diagram of a data processing system that may be implemented as a server, such as server 102 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Modem 218 and network adapter 220 are connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention recognizes that a low-level interface to a processor or processor core, such as JTAG, is typically the first interface that is brought up on a data processing system. The present invention also recognizes that these types of interfaces also are likely to be one of the last interfaces to fail. Thus, this type of connection is ideal for a low-level console in accordance with a preferred embodiment of the present invention. As mentioned above, a low-level console is a console that employs a connection to a chip or processor core without requiring I/O subsystem components, such as an I/O controller or I/O bus bridge. Further, this type of console avoids using other components, such as a serial bus or Ethernet adapter connected to the I/O subsystem.

The mechanism of the present invention takes advantage of the fact that many processors also contain data or scratch registers that are left unused during a large portion of the initialization as well as in actual use. These registers are accessible via JTAG or other code running on the processors. In addition, currently available processors also provide facilities to issue interrupts via JTAG to the processor core.

With these facilities, a serial interface for bridging a host system that has access to a JTAG interface to the operating system running on a processor in a client system is provided. These features in the processors are used in the low-level console described in the illustrative embodiments.

The serial interface for the low-level console in these examples involves using an asymmetric protocol in the illustrative examples. This protocol is designed such that the client has easier access than that of the host, but the host has more resources to allocate to this interface. In these illustrative examples, the client is the data processing system such as system 200 in FIG. 2 to which the low-level console has an interface. The portion of the console that provides a display for a user is located at the host system such as system 100 in FIG. 1 in this example. As illustrated, read and write access provides a method to debug software on the client at a low-level interface. This mechanism also may be used for higher level protocols, such as transferring files. Additionally, data may be transferred to and from the client through multiple channels in these examples.

In the depicted embodiments, the client is allowed to fill an output register with a full word of data at any time. With this setup, if the host is trying to read memory or flush the partial word in a channel, the host accepts data from the client for any output stream.

The client is allowed to defer a set of input characters presented to the client at any time by providing a reject signal. The client waits synchronously for the host to remove the request. This request may be retried at a later time, but the client will not prompt the host of its receptiveness to new characters.

In addition to providing a console interface, it is further desirable to provide a method and apparatus for file transfer to the host. These files may be, for example, debug data collected after a failure for later analysis. Alternatively, a custom program for analyzing a failure may be written and transferred to the client. This mechanism of the present invention also includes multiplexing and demultiplexing of several channels over these registers. In addition to console access, one channel can be allocated to network traffic using a protocol such as point-to-point protocol (PPP), allowing the use of familiar TCP/IP commands such as FTP. Alternatively, file transfer programs designed for modems such as xmodem can be employed.

This particular illustrative embodiment is targeted to debug larger systems, a provision is present to directly request the contents of arbitrary memory in the client. Those of ordinary skill in the art will recognize how to build debuggers based on these primitives.

With reference now to FIG. 3, a diagram illustrating components used in a low-level console is depicted in accordance with a preferred embodiment of the present invention. As illustrated, client system 300 contains processor core 302, processor core 304, and memory 306 connected to bus 308. The processor cores may be located in one or more processor chips, such as processors 202 and 204 in FIG. 2. Additionally, console registers 310 are present in client system 300. Client 300 may be implemented using a data processing system, such as data processing system 200 in FIG. 2. In the depicted examples, the registers are located on the chip. Such an arrangement of registers on the chip is not required. The registers may be located anywhere in the data processing system as long as both the processor core and the service bus controller have access to the registers. One advantage of using registers closer to the processor core is that a fault between the registers and the core is less likely.

The mechanism of the present invention uses unused or spare registers within client system 300. In this example, console registers 310 contain host output data word 312, client output data word 314, client output register 316, and host request control register 318. As depicted, host output data word-and client output data word are full words. These words may be of different sizes, such as, for example, 32 or 64 bits, depending on the implementation. Of course, other sizes of registers may be used depending on the particular implementation.

The console is present in host system 320. Host system 320 contains virtual channel 322, virtual channel 324, virtual channel 326, and memory read/write debug control window 328. Virtual channels over a data link are separated into separate resource streams in these illustrative examples. The streams may be, for example, for separate command windows, a status monitoring window, and/or a network protocol, such as PPP. The console system in host system 320 is connected to client 300 through a data link. This data link includes service bus controller 330. This controller takes the form of a service processor in these examples, but the controller may take other forms, such as an application specific integrated circuit (ASIC). A user at host system 320 may log into client system 300 through a JTAG bus in client system 300. Data link 332 is a debug/service interface in these examples. Specifically, a JTAG interface to console registers 310 is employed. Of course, any low-level interface to the client system, providing a connection to the processor cores or control registers in the processor cores, may be employed. For example, an I$^2$C interface also may be used. Connection 334 in these examples may be a higher level connection, such as an Ethernet connection.

With reference now to FIG. 4, a diagram illustrating components for a console implementation is depicted in accordance with a preferred embodiment of the present invention. As illustrated in this example, main memory 400 is a memory, such as memory 306 in FIG. 3. This memory can be accessed by debug channel 402. This debug channel allows access to any portion of a system memory, such as main memory 400. Main memory 400 also contains input buffers 404, 406, and 408. Output buffers 410, 412, and 414 also are present in main memory 400. Input buffer 404 and output buffer 410 are associated with channel 416. Input buffer 406 and output buffer 412 are associated with channel 418. Input buffer 408 and output buffer 414 are associated with channel 420 in these examples. Additionally, saved address 450 is located in memory 400. This address may be used to transfer data between the host and client.

Processor core 422 is in communication with main memory 400. Processor core 422 may be, for example, a processor core, such as processor core 302 in FIG. 3. Service bus controller 423 is a service bus controller, such as service bus controller 330 in FIG. 3. Host output data words may be sent from service bus controller 423 to the various channels associated or assigned to main memory 400. This data word is placed into input buffers, such as input buffer 404, 406, or 408. Additionally, host output data word 426 may be sent to debug channel 402. The data is not placed in the input or output buffer by the service bus controller 423. Instead, the data is processed by processor core 422 and assigned to buffers 404, 406, 408, or written directly to an arbitrary specified location as selected by a protocol for debug channel 402. Additionally, the client may send data via client output data word 424 to host 425. Host 425 may be, for example, host 320 in FIG. 3. Client output data word 424 is a register that holds data that is to be sent to host 425.

Service bus controller 423 and the channels do not communicate directly in these examples. Instead, channels 416, 418, and 420 provide data, which is transferred by processor core 422 to and from the registers, host output data word 426, client output data word 424, client output register 428, and host request control register 430. The host accesses these registers through service bus controller 423 and presents the data to channels 322, 324 and 326 in FIG. 3.

A channel may send this data word to service bus controller 423 for transfer to the host 425 by placing this data in an output buffer, such as output buffer 410, 412, or 414. The data in these output buffers is output data that is stored in a register, such as client output data word 424. The register may contain data from any of the three channels in these examples. Also, the last byte to fill in client output data word 424 indicates the number of valid bytes if only a partial word is present.

The presence of data to be sent to the host 425 in client output data word 424 is signaled by setting a value in client output register 428. This register is set by processor core 422 in these examples. Service bus controller 423 monitors this client register to identify when data is to be sent to the host 425 from the output buffers.

When a request is being made by the host to send data to the client, service bus controller 423 sets host request control register 430 in response to receiving the request from the host. The setting of this register provides a signal or indicator to processor core 422 that data in host output data word 426 is to be sent to an input buffer, such as input buffers 404, 406, or 408. Host output data word 426 may contain data for any of the three channels in these examples.

Turning now to FIG. 5, a diagram illustrating fields within a client output register and a host request control register is depicted in accordance with a preferred embodiment of the present invention. Client output register 500 contains fields that may be set by a client, such as client 300 in FIG. 3. Client output register 500 may be, for example, client output register 428 in FIG. 4. In this example, the fields include activity channel #0 502, activity channel #1 504, activity channel #2 506, host request reject 508, read data or channel flush result 510, full word data channel 2 512, full word data channel 1 514, and full word data channel 0 516. Host request register 518 contains fields that may be set by a host, such as host 328 in FIG. 3. Host request register 518 contains fields select channel #0 520, select channel #1 522, select channel #2 524, poll bit 526, read bit 528, and counter bits 530, 532, and 534.

In FIG. 5, client output register 500 is set by the client with the host clearing the bits. Host request register 518 is set by the host with the client clearing the bits.

With reference now to FIG. 6, a table indicating requests that occur in response to setting different bits is depicted in accordance with a preferred embodiment of the present invention. Table 600 identifies requests based on the setting of different bits within a host request control register, such as host request control register 518 in FIG. 5.

Entry 602 indicates the presence of a read request for a specified location and sets a remembered address. Entry 604 indicates a write request at a remembered address and then increments the address. Entry 606 polls any channel with full data. Entry 608 polls channel c as selected by bits, such as bits 520, 522 and 524 in FIG. 5, and sets a partial data word if the output register is not busy. Entry 610 indicates that a number of bytes are ready for a channel. The channel is selected by bits, such as bits 520, 522 and 524 in FIG. 5. The number of bytes is determined by taking the count formed by bits, such as bits 530, 532 and 534 in FIG. 5 and incrementing by one. Entry 612 is reserved in this example and not used for any purpose.

Figure 7:
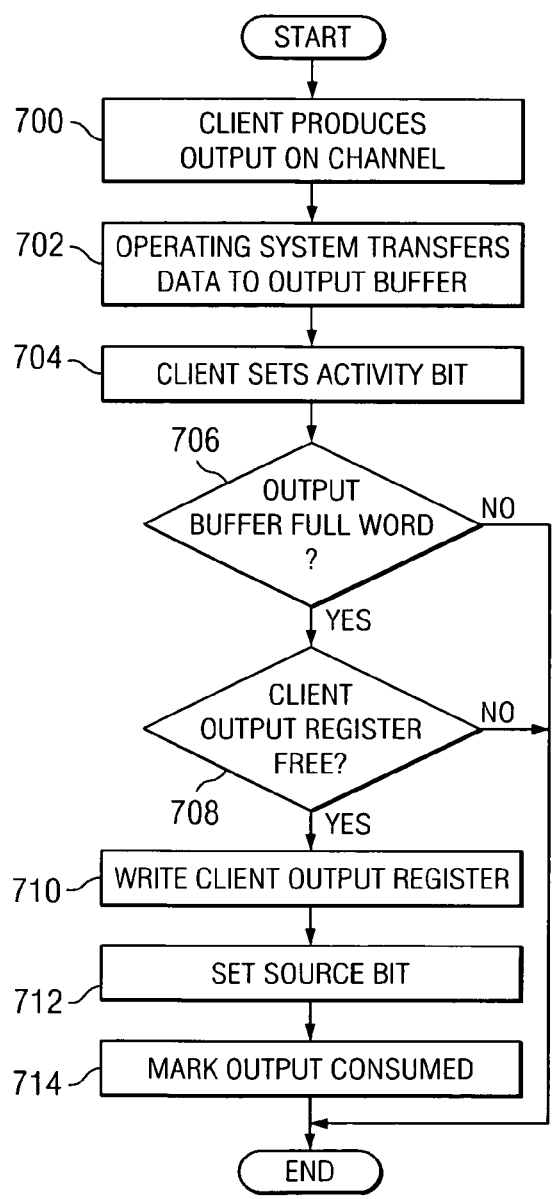
FIG. 7 is a flowchart of a process for a client to transfer data in accordance with a preferred embodiment of the present invention.

With reference now to FIG. 7, a flowchart of a process for a client to transfer data is depicted in accordance with a preferred embodiment of the present invention. The process illustrated in FIG. 7 may be implemented in a client system, such as client system 300 in FIG. 3.

The process begins with the client producing an output on a channel (step 700). This output is placed onto a channel, such as channel 418 in FIG. 4. Next, the operating system transfers the data to an output buffer (step 702). This is an output buffer, such as output buffer 412 in FIG. 4. Thereafter, an activity bit is set by the client (step 704). This bit is a bit, such as activity channel# 1 bit 504 in FIG. 5.

Then, a determination is made as to whether the output buffer contains a full word (step 706). If the output buffer contains full word, the client may send this full word to the host. In that case, a determination is made as to whether a client output data word is free (step 708). This check is made to determine whether a client output data word, such as client output data word 424 in FIG. 4, is already in use.

If the client output data word is free, the data is written to the client output register (step 710). This is a register, such as client output data word 424 in FIG. 4. Next, the source bit is set (step 712). This source bit is a bit, such as full data word channel 1 514 in FIG. 5. Thereafter, the output is marked as being consumed (step 714) with the process terminating thereafter. This change in status is marked in a buffer, such as output buffer 412 in FIG. 4.

With reference again to step 708, if the client output register is not free, the process terminates. The process also terminates if the output buffer does not contain a full word in step 706. In these examples, steps 700, 702, and 714 are steps that are typically performed by an operating system routine.

Figure 8:
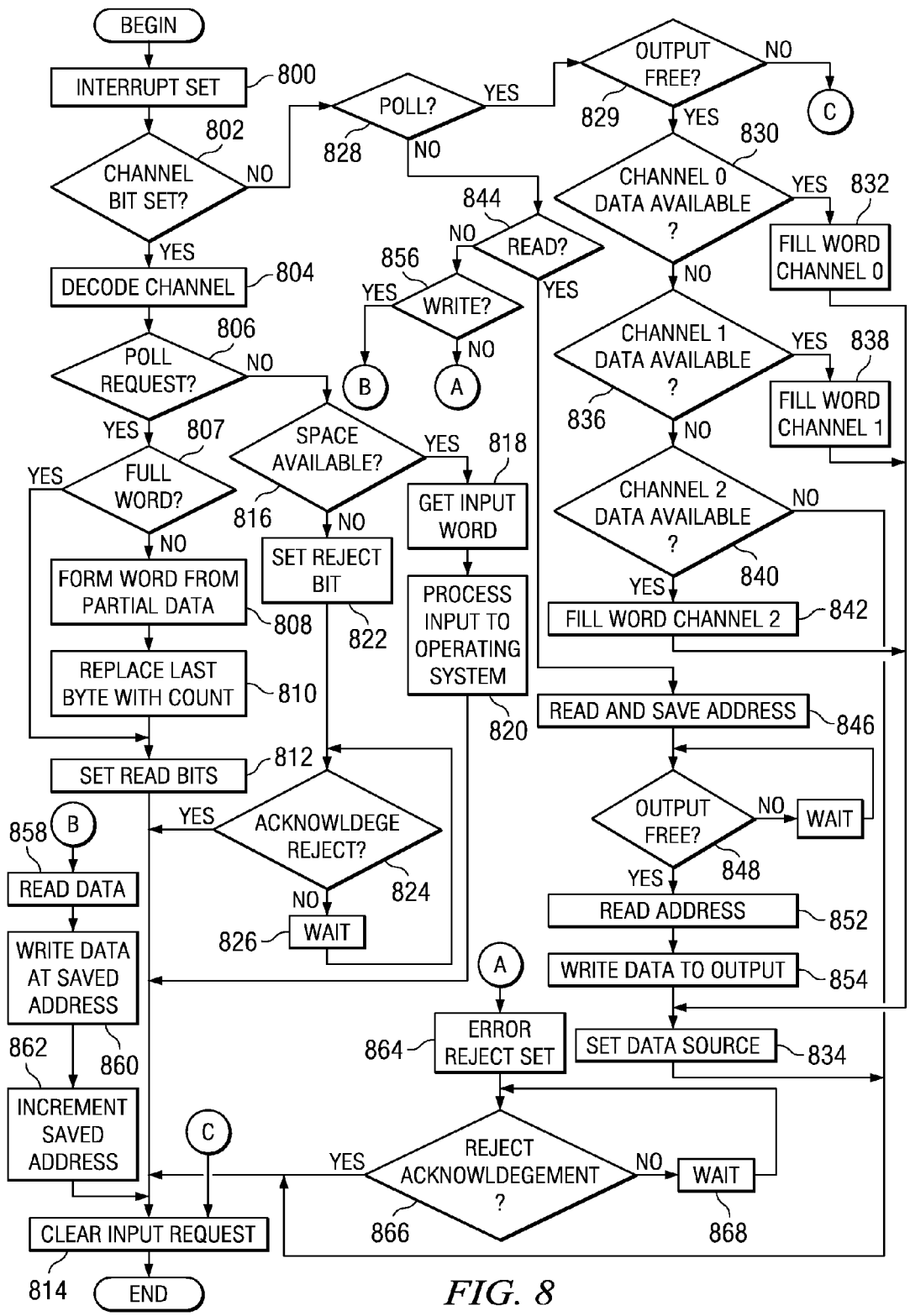
FIG. 8 is a flowchart of a process in a client in accordance with a preferred embodiment of the present invention.

Turning now to FIG. 8, a flowchart of a process in a client is depicted in accordance with a preferred embodiment of the present invention. The process illustrated in FIG. 8 may be implemented in a client, such as client system 300 in FIG. 3.

In this example, the process begins with receiving an interrupt (step 800). Step 800 is used to receive an interrupt from host/service controller by client system. The service controller is a proxy or agent for the host. The interrupt may be automatically generated by a non-zero value in a host request register, such as host request register 518 in FIG. 5. Alternatively the client could poll a host request register, such as host request register 518 in FIG. 5 on a periodic basis. In this case the process would terminate if no bits were set in a host request register. Next, a determination is made as to whether any of the channel bits are set within the register (step 802). These channel bits are bits, such as select channel #0 520, select channel #1 522, or select channel #2 524 in Host request register 518 in FIG. 5. This step is employed to determine whether the request relates to a specific channel.

With reference to step 802, if none of the channel bits are set, then a determination is made as to whether a poll is to occur (step 828). This determination is made by checking to see whether a poll bit, such as poll bit 526 in FIG. 5 has been set in the host request register. If the poll bit has been set, a determination is then made as to whether a client output data word is free (step 829). This client output data word may be client output data word 424 in FIG. 4. The client output data word is considered free when the host has cleared all of the following bits in a client output register, such as client output register 428 in FIG. 4: read data or channel flush result, such as bit 510 in FIG. 5 and full word data bits, such as bits 512, 514 and 516 in FIG. 5. If the client output data word is not free the input request is cleared (step 814). The input request is cleared in the depicted examples by clearing the bits in the host request register. The process terminates there after. Otherwise a determination is then made as to whether channel 0 has a full word of data available (step 830). If a full word of data is not available in channel 0, a determination is made as to whether a full word of data is available in channel 1 (step 836). If a full word of data is not available in channel 1, a determination is made as to whether a full word of data is available in channel 2 (step 840). In these examples, only three channels are shown, any number of channels may be multiplexed using the mechanism of the present invention. If a full word of data is available in channel 0, then the word is consumed from the output buffer for channel 0 (step 832). Thereafter, the data source is set (step 834). The data source is set by setting a bit in a client output register, such as client output register 500 in FIG. 5. In this particular example bit 516 in FIG. 5 would be set indicating the data word was from virtual channel# 0. Next, the process proceeds to step 814 as described above.

With reference again to step 836, if a full word of data is available in channel 1, a word is consumed from the output buffer for channel 1 (step 838) with the process the proceeding to step 834 as described above. In this example step 834 would set bit 514 in register 500 in FIG. 5.

With reference again to step 840, if a full word of data is not available for channel 2, the process proceeds to step 814 as described above. Otherwise, a word of data is consumed from the output buffer for channel 2 (step 842) with the process then proceeding to step 834 as described above. In this example step 834 would set bit 512 in register 500 in FIG. 5 indicating that the data is from channel 2.

If a channel bit is set (step 802), then the channel is decoded (step 804). Step 804 decodes any channel that has a set bit. Next, a determination is made as to whether a poll request is being made (step 806). This determination may be made by examining the host requests register to see whether a poll bit is set in the host requests register. If a poll request is not present, by elimination the host is providing input data for a channel. A determination is made as to whether space is available (step 816). Step 816 is performed to see whether space is present in the buffer to store data. This buffer is a buffer such as the input buffers illustrated in FIG. 4. If space is available, then an input word is obtained (step 818). The input word is obtained from host output data word 426, which is a register used by the host to send data to the client. In step 818, a count is formed by bits in a host request control register, such as bits 530, 532 and 534 in the host request register in 518 in FIG. 5. The value count plus one is computed and used to specify the number of bytes valid in host output data word 426. The remaining bytes are ignored.

Thereafter, the valid bytes in the input word are processed and sent to the operating system (step 820) with the process then proceeding to step 814 as described above. If space is unavailable in step 816, a reject bit is set (step 822). This reject bit is a bit, such as host request reject 508 in FIG. 5. This bit is set to let the host know that the request has been rejected and provides the host an opportunity to withdraw the request.

Thereafter, a determination is made as to whether the rejection has been acknowledged by the host (step 824). If the rejection has not been acknowledged by the host, the process waits for a period of time (step 826). Thereafter, the process returns to step 824 as described above. Acknowledgment of the rejection of the request results in the process proceeding to step 814 as described above.

With reference again to step 806, if a poll request is being made, a determination is made as to whether a full word is present in the output buffer (step 807). If a full word is not present, then a word is formed using the partial data (step 808). The word is formed by placing filler data within the word to form a full word in step 808. This filler data may be, for example, a set of null values.

Thereafter, the last byte in the word is replaced with a count to identify the good data (step 810). Next, a read bit is set (step 812). The read bit is set in a client output register, such as client output register 500 in FIG. 5. Thereafter, the input request is cleared (step 814). The input request is cleared in the depicted examples by clearing the bits in the host request register. The process terminates thereafter.

With reference again to step 807, if a full word is present, the word is placed a client output data word, such as client output data word 424 in FIG. 4 and then the corresponding bit, such as full word data channel 0 516, full word data channel 1 514, or full word data channel 2 512 in FIG. 5, is set in client output register 500 in FIG. 5. The particular bit set depends on the channel selected. This process is similar to steps 830, 832 and 834 above.

With reference again to step 828, if the poll bit, such as poll bit 526 in FIG. 5, is not set, a determination is made as to whether the read bit, such as read bit 528 in FIG. 5, is set (step 844). This determination is made by checking the read bit in the host requests register. If the read bit is set, the host output register, such as host output data word 426 in FIG. 4, is read and its contents are designated as an address which is saved. The address is saved in a buffer, such as saved address 450 in FIG. 4 (step 846). A determination is then made as to whether the output is free (step 848). In step 848, the determination is the same as that made in step 829 above.

Thereafter, the process returns to step 848. When the output is free, the address is read (step 852). In this example, in step 852, the memory location in main memory 400 at saved address 450 is read and its contents are placed in client output data 424.

Afterwards, the data is written to the output (step 854). The process then proceeds to step 834 as described above.

With reference again to step 844, if the read bit is not set, a determination is made as to whether the write bit has been set (step 856). A determination is then made as to whether a write is to occur. In this example, in step 856, if bit 530 is set, this indicates that a write request is present. Bit 530 is shared with the count used in steps 818 and 820. If a write is to occur, the data is read (step 858). Thereafter, the data is written and saved at the address (step 860). In step 860, data from step 858, obtained via a register, such as host output data word 426, is stored into main memory 400 at saved address 450 in FIG. 4. Thereafter, the saved address is incremented (step 862). In step 862, the address, such as saved address 450 in FIG. 4, is incremented by the word size. This implementation increases the efficiency of writing a block of memory. The process then proceeds to step 814 as described above.

With reference again to step 856, if a write is not present, then an error occurs and a reject is set (step 864). A determination is made as to whether the host has acknowledged the reject (step 866). If the reject has not been acknowledged, the process waits for a period of time (step 868) with the process then returning to step 866. Upon acknowledgement of the reject, the process then proceeds to step 814 as described above.

Figure 9:
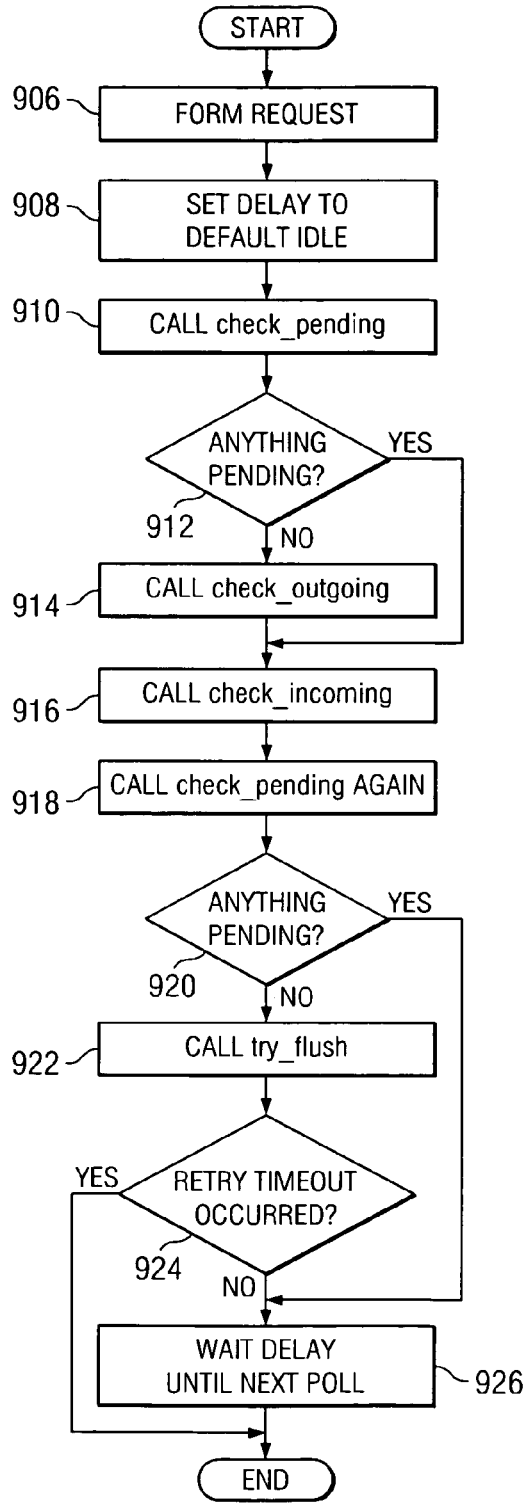
FIG. 9 is a flowchart of a host process for a low-level console system in accordance with a preferred embodiment of the present invention.

With reference now to FIGS. 9-15, flowcharts of a process for a host process for a low-level console are shown. FIG. 9 is an overall or main loop for the process while the other figures show routines that are called from the main loop or other routines.

With reference now to FIG. 9, a flowchart of a host process to multiplex and demultiplex the channel for a low-level console system is depicted in accordance with a preferred embodiment of the present invention. The process in FIG. 9 may be implemented in a host, such as host system 320 in FIG. 3.

The process begins by allowing each channel to form a request. In these examples, three channels are present. Of course, other numbers of channels may be used depending on the particular embodiment. For each channel with available data, up to a word of data is obtained from the channel and a request is formed to submit the data to the client (step 906). Next, a delay is set to default idle (step 908). The delay is the amount of time to wait for the client to react to a host request placed in a host request register, such as host request control register 430 in FIG. 4, or fill a output data word, such as client output data word 424 in FIG. 4 at step 928 below. The delay is adjusted in various steps in FIG. 9 based on what progress was made in the execution of the routines called in FIG. 9. A call is made to a check_pending routine (step 910). A determination is then made as to whether a request is pending (step 912). This determination is made based on the results from the check_pending routine called in step 910. If a request is not pending, a call to a check_outgoing routine is made (step 914). This check is made to determine if a channel may send a request to the client.

Thereafter, a call to a check_incoming routine is made (step 916). A call to a check_pending again routine is made as most host requests are quickly serviced by the client (step 918). A determination is then made as to whether a request is pending (step 920). If a request is pending, the process waits for a delay until the next poll (step 926) with the process terminating thereafter. This delay is the delay set in step 908 above. Otherwise, a call to a try_flush routine is then performed (step 922). The try_flush routine is used to prompt the client to send more output from its buffers, such as output buffers 410, 412, and 414 in FIG. 4, to the host through the client data registers, such as client output data word 424 and client output register 428 in FIG. 4. Next, a determination is made as to whether a retry timeout has occurred (step 924). If a retry timeout has not occurred, the process proceeds to step 926 as described above. Otherwise, the process terminates.

With reference again to step 912, if data is pending, the process proceeds to step 916. This process in FIG. 9 is actually an infinite loop with the process actually starting again.

Figure 10:
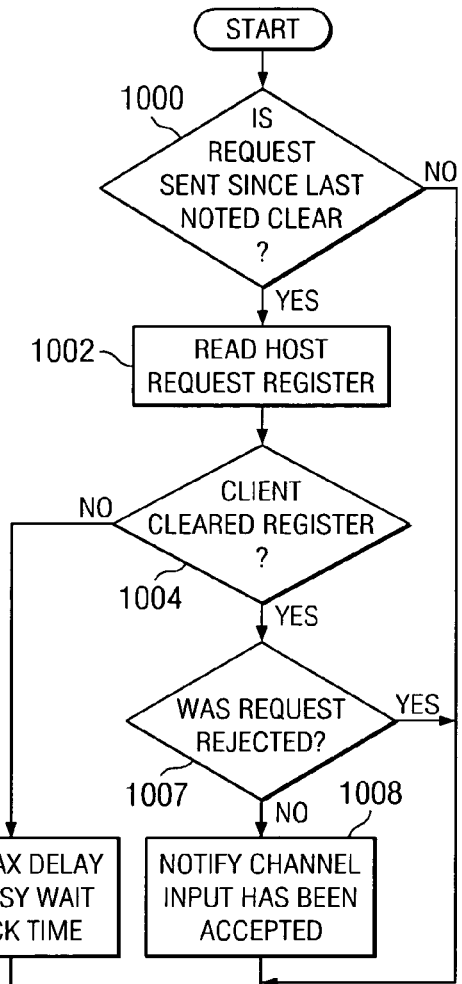
FIG. 10 is a flowchart of a check_pending routine in accordance with a preferred embodiment of the present invention.

Turning next to FIG. 10, a flowchart of a check_pending routine is depicted in accordance with a preferred embodiment of the present invention. The flowchart in FIG. 10 is a more detailed description of the routine called in step 910 in FIG. 9. This routine is used to determine whether a pending request has been processed by the client.

The process begins by determining whether a request has been sent since the last time the request register was known to be clear from a previous call to this routine (step 1000). The check is made with respect to the host requests register. If a request has been made since the last clearing of the register, the host requests register is read (step 1002). A determination is then made as to whether the client has cleared the host requests register (step 1004).

If the client has not cleared the register, a maximum delay is set to busy wait check time (step 1006) with the process terminating thereafter. Step 1006 sets a variable timeout to limit the time spent back in step 926 in FIG. 9. Otherwise, a determination is made if the request was rejected by the client (step 1007). If the request was rejected, the process terminates. Otherwise, a notification is made that the channel input has been accepted (step 1008) with the process terminating thereafter. This notification allows the channel to obtain more input and create a new request.

With reference again to step 1000, if a request has not been sent since the last clear has occurred, the process terminates.

Figure 11:
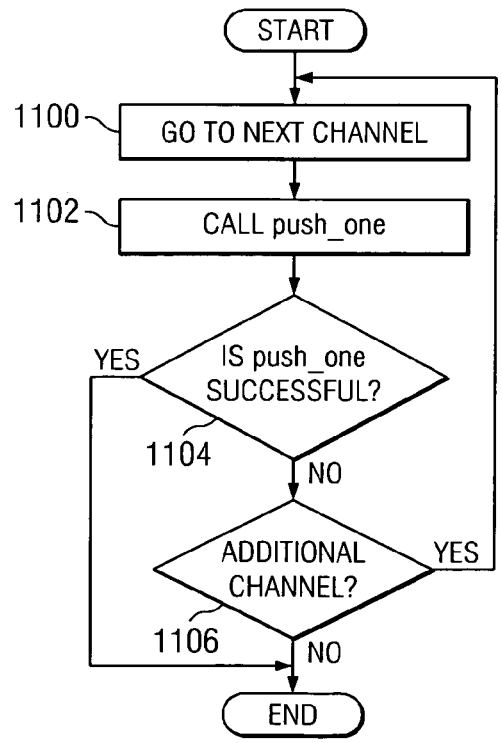
FIG. 11 is a flowchart of a process for a check_outgoing routine in accordance with a preferred embodiment of the present invention.

Turning now to FIG. 11, a flowchart of a process for a check_outgoing routine is depicted in accordance with a preferred embodiment of the present invention. The process in FIG. 11 is a more detailed description of the process called by step 914 in FIG. 9.

The process begins by going to the next channel (step 1100). The first time step 1100 is encountered results in the maintenance channel being selected. The maintenance channel is used to submit poll requests by the try_flush routine and read and write requests for the debug channel. This semi-channel processes the client data when the read bit is set. The use of maintenance channels allows for the processing of requests other than supplying input for a channel while maintaining the structure of the code. Thereafter, a call for a push_one routine is made (step 1102). Next, a determination is made as to whether the push_one routine was successful (step 1104). If the routine was not successful, a determination is made as to whether an additional channel is present (step 1106). This step checks the different channels, such as channel 0, channel 1, and channel 2. If an additional channel is present, the process returns to step 1100. Otherwise, the process terminates. The process also terminates if the push_one routine is successful in step 1104.

Turning next to FIG. 12, a flowchart of a push_one routine is depicted in accordance with a preferred embodiment of the present invention. The process illustrated in FIG. 12 is a more detailed description of step 1102 in FIG. 11.

The process begins by determining whether a request is present to send to the host for the chosen channel (step 1200). If a request is present, a determination is made as to whether the request has been previously been rejected by the client (step 1202). This determination is made when polling a client output register, such as client output register 500 in FIG. 5, to see if a reject bit, such as host request reject bit 508 in FIG. 5, is set. The channel request is marked as having been rejected and a timer is set. This timer is the timer checked in step 924 if FIG. 9. See also step 1306 in FIG. 13 below.

If the request had not been rejected by the client, a determination is made as to whether the request has data (step 1204). A request such as generic poll request 606 in FIG. 6 may have no data to transfer via host output data word 426 in FIG. 4. If the transaction has data, a determination is made as to whether the data for this transaction is different from the data last written in the host data register (step 1206). If the data is different, the host data register is written with the data that is present (step 1208).

Thereafter, the request is written to the host request register (step 1210). In this step, the request is written to a host requests register, such as host request control register 430 in the manner encoded in the example in FIG. 6. Next, the delay is limited to the delay for checking the first time after a request is sent (step 1212). This delay is used to adjust the time limit for further polling in step 926 in FIG. 9. Thereafter, success is signaled (step 1214) with the process terminating thereafter.

With reference again to step 1206, if the data is not different from the data last written in the host register, the process proceeds directly to step 1210. In this case, the data in the host data register has not changed and a write request is performed without updating the register. With reference again to step 1204, if the transaction does not have data, the process proceeds to step 1210.

Referring back to step 1202, if the data has been rejected by the client, A determination is made as to whether a retry timer has expired (step 1220). If the retry timer has not expired, a failure is signaled (step 1222) with the process terminating thereafter. The process also proceeds to step 1222 if a request to be sent to the client does not exist in this channel in step 1200.

Figure 13:
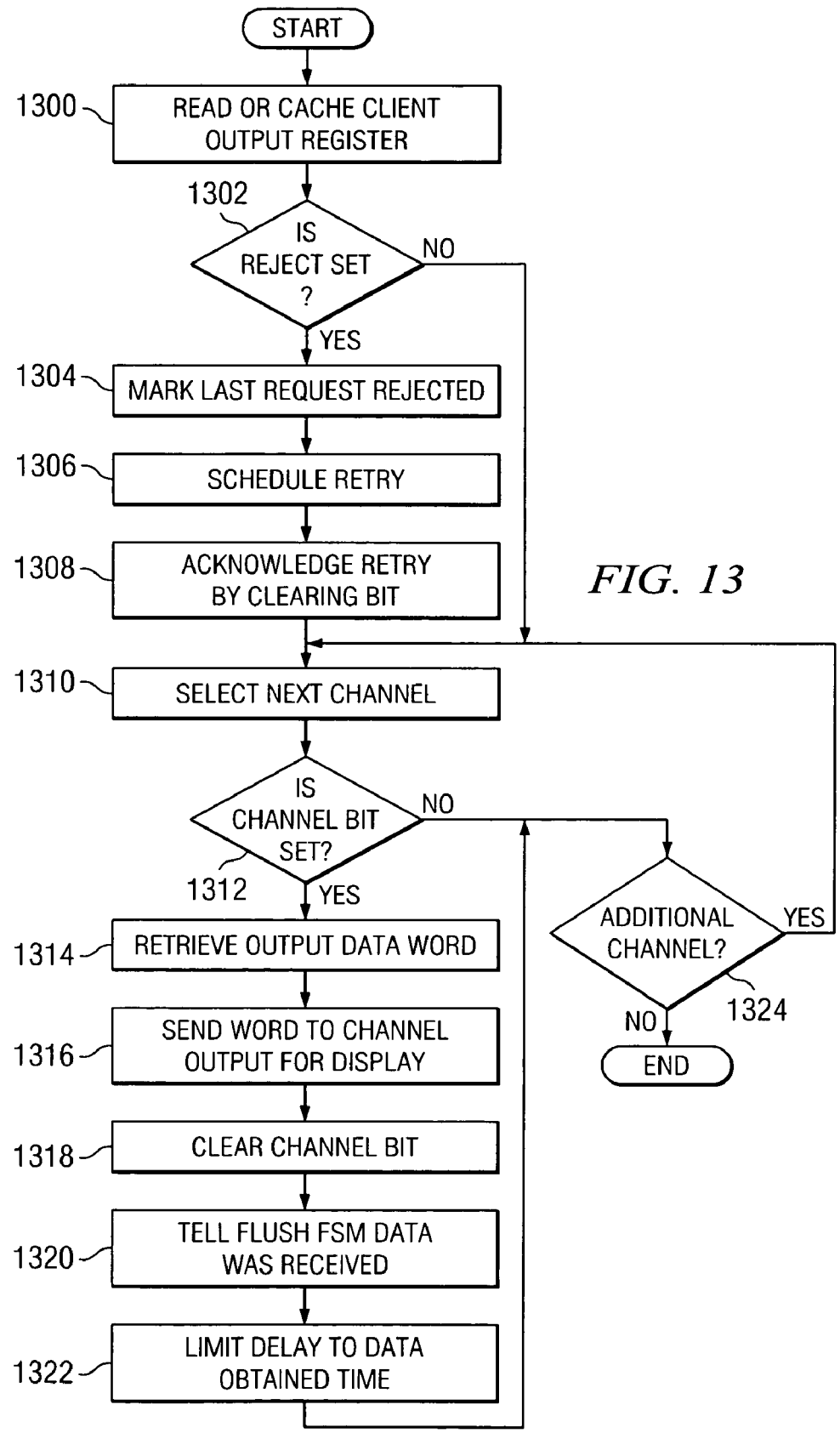
FIG. 13 is a flowchart of a process for a check_incoming routine in accordance with a preferred embodiment of the present invention.

With reference now to FIG. 13, a flowchart of a process for a check_incoming routine is depicted in accordance with a preferred embodiment of the present invention. The process illustrated in FIG. 13 is a more detailed description of step 916 in FIG. 9. The process begins by reading a client output register (step 1300). In this step, the read is performed by telling the service request controller to fetch the contents of the client output register and then saving the result in the hosts memory ("caching").

A determination is made as to whether a reject has been set in the register (step 1302). In this step, the reject is set by the client when the client is unable to accept and buffer the input as described in step 822 in FIG. 8. This situation probably means that more processing is needed by the application processing a channel, such as channel 416, on the client. This situation also may signify that the channel is not connected (open) by any application.

Next, if the request was rejected, the last request is marked as rejected (step 1304). The data may have been rejected because the client sends data, which is to be accepted by the host. A retry is scheduled (step 1306). The retry is acknowledged to the client by clearing the reject bit (step 1308). In these examples, the reject bit is a bit such as host request reject 508 in client output register 500 in FIG. 5.

The process then proceeds to select the next channel (step 1310). The first time step 1310 is encountered results in the next channel selected being the first channel. A determination is made as to whether a channel bit has been set (step 1312). In these examples, the channel bit is a bit set in the host request register. These channel bits may be, for example, full word channel# 0 516, full word channel# 1 514 or full word channel# 2 512 in client output register 500 in FIG. 5. A channel bit is set by the client when data is to be sent through that channel. If the channel bit is set, an output data word is retrieved from the channel by reading a client output data word, such as client output data word 424, in FIG. 4 (step 1314).

This data word contains data from the client in these examples. The data word is sent to the channel output for display (step 1316). The channel bit is then cleared (step 1318). Thereafter, a finite state machine (FSM) is told that the data was received (step 1320). In this step, the FSM represents the combination of storage (state) and the transitions as described in the flowchart in FIG. 14. The delay is limited to the delay for checking again after data has been received (step 1322). This delay is the delay used in step 926 in FIG. 9. Then, a determination is made as to whether an additional channel is present to be checked (step 1324). If an additional channel is not present, the process terminates. Otherwise, the process returns to step 1310 to select the next channel for processing.

With reference again to step 1312, if a channel bit is not set, the process also proceeds to step 1324 because no data is available in the channel. With reference back to step 1302, if the reject bit is not set, the process proceeds directly to step 1310 as described above.

Figure 14:
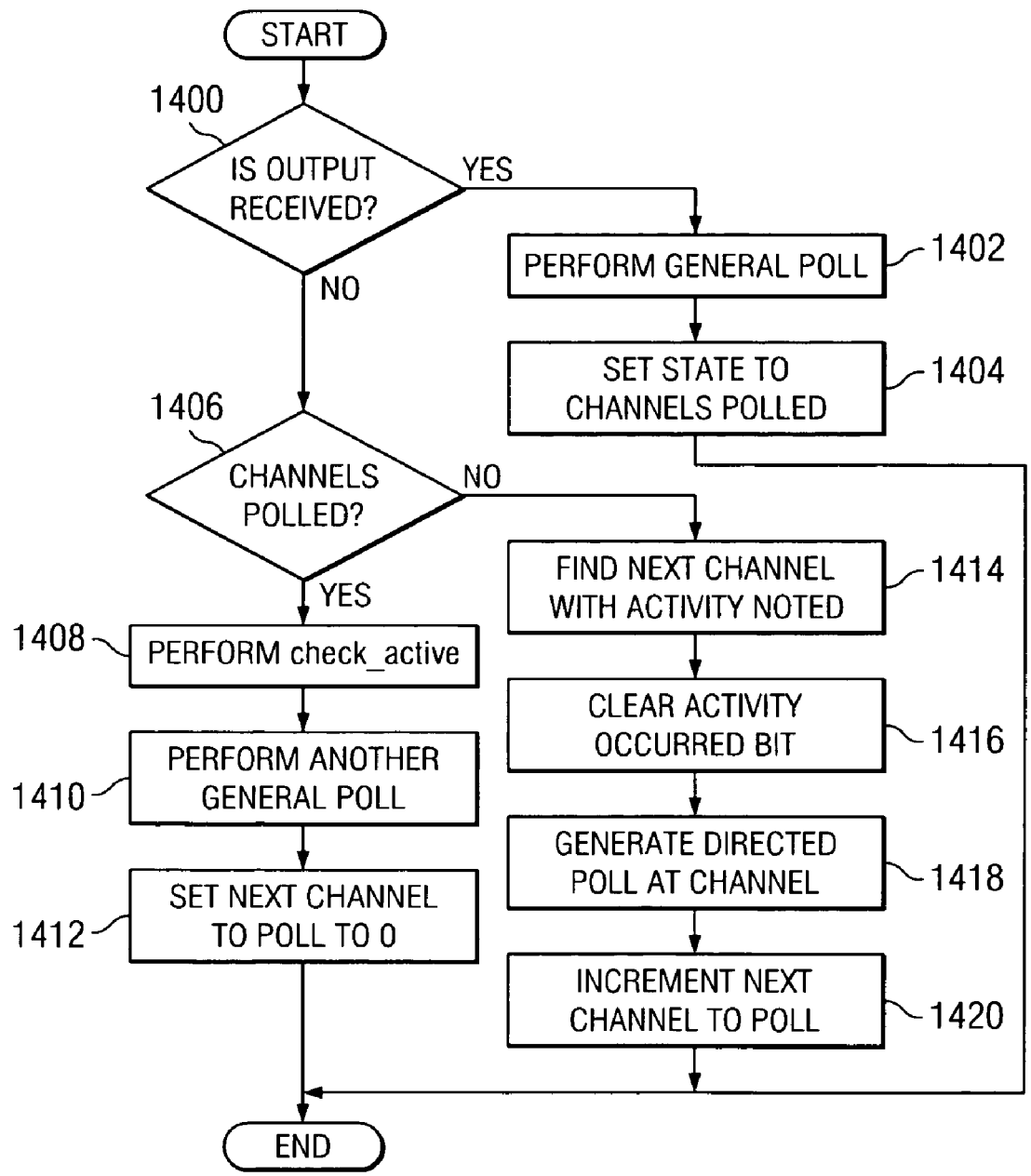
FIG. 14 is a flowchart of a try_flush routine in accordance with a preferred embodiment of the present invention.

With reference now to FIG. 14, a flowchart of a try_flush routine is depicted in accordance with a preferred embodiment of the present invention. The flowchart in FIG. 14 is a more detailed description of step 922 in FIG. 9. The states in this figure are ones referred to in step 1320 in FIG. 13.

The process begins by determining whether an output from the client has been received (step 1400). Output has been received if step 1320 in FIG. 13 was executed. If output has been received, a general poll is performed (step 1402). Polling is a generic term asking the client to provide more data. A general poll is shown in entry 606 in FIG. 6 and causes the path through steps 828, 830, 836, and 840 in FIG. 8 to be traversed in the client. This type of polling is in contrast to the poll for contents in specific channel, which occurs in step 1418 below, as represented in entry 608 in FIG. 6, and executed by the client in step 806 in FIG. 8.

Thereafter, the state is set to channels polled (step 1404). The state is the local storage of the host that implements the FSM of FIG. 14. This state allows different branches of FIG. 14 depending on the past history and other influences, such as in step 1320 in FIG. 13. Since FIG. 14 produces host requests, the host cannot spin waiting for the client that could be waiting for the host.

The process terminates thereafter.

With reference again to step 1400, if an output has not been received, a determination is made as to whether channels have been polled in the previous invocation of the process depicted in FIG. 14 (step 1406). The determination is made by remembering the execution of step 1404 in the state of the FSM. If the channels have been polled, a check active routine is performed or initiated (step 1408). When the client transfers data from its channel to its output buffers, such as output buffers 410, 412, and 414 in FIG. 4, the client sets the corresponding activity bits, such as activity channel #0 502, activity channel #1 504, and activity channel #2 506 in the client output register 500 in FIG. 5.

In addition, the client is allowed to transfer data from the output buffers, such as output buffers 410, 412, and 414 in FIG. 4, to client output data word 424 in FIG. 4 and set the channel output bit, such as full word data channel 0 516, full word data channel 1 514, and full word data channel 2 512 in FIG. 5.

Since the client may have accumulated less than a full word of data in the output buffers, a specific poll channel request is needed to obtain these characters and transfer them to the host for presentation, such as through virtual channels 322, 324, and 326 in FIG. 3. These channels may, for example, prompt the user for more input. The activity bits provide a means for the client to tell the host that more data may be available, and it should initiate the channel poll, such as shown in entry 608 in FIG. 6, to flush partial data, such as, steps 808 and 810 in FIG. 8.

Thereafter, another general poll is performed (step 1410). Data is more efficiently transferred on a channel with a full word. This step delays per channel polling. The process then sets the next channel to poll to channel 0 (step 1412) with the process terminating thereafter. This state is remembered and causes the next invocation to proceed to step 1414, unless output is received as determined in step 1400.

With reference again to step 1406, if the last state is not channels have not been polled, the next channel with activity is located (step 1414). The next channel found is determined by starting with the channel remembered by the previous state such as state 1412 above. Thereafter, an activity occurred bit is cleared (step 1416). The bit in step 1416 is located in the host memory, but is set by the check active routine. The host memory is a cache of activity channel #0 502, activity channel #1 504, and activity channel #2 506 and is used to avoid multiple requests via service bus controller 423. It is assumed those requests are relatively slow, perhaps taking a million times longer than reading local host memory.

Next, a poll of a selected channel is generated (step 1418) with the process terminating thereafter. The try_flush routine is the only routine to cause a poll of a selected channel, such as the request in entry 608 in FIG. 6 and therefore is the only method a partial word will be executed by the client through step 808 in FIG. 8.

With reference now to FIG. 15, a flowchart of a check active routine is depicted in accordance with a preferred embodiment of the present invention. The flowchart in FIG. 15 is a more detailed description of step 1408 in FIG. 14. The process begins by reading activity bits (step 1500). These activity bits, such as activity channel #0 502, activity channel #1 504, and activity channel #2 506 indicated the client has placed some data in its output buffer such as buffers 410, 412 and 414 in FIG. 4. The process then proceeds to select an activity bit for processing (step 1502). A determination is made as to whether the selected activity bit is set (step 1504). If the selected bit is set, then a local cache copy is set (step 1506). The bit is cached in local host memory. This bit is stored along with other control information for the channel, such as, for example, the destination to write data received from the client, the source of data to be sent to the client on this channel, the word sized buffer of data to be sent to the client, the number of bytes in that buffer, and the retry timer for when the request is rejected by the client.

Thereafter, the activity bit is cleared in the client output register (step 1508). A determination is then made as to whether additional activity bits are present (step 1510). If additional activity bits are not present, the process terminates. Otherwise, the process returns to step 1502 as described above. Referring back to step 1504, if the selected activity bit for processing is not set, the process proceeds to step 1510 as described above.

Turning now to FIG. 16, a diagram illustrating code for a JTAG base console on the host side is depicted in accordance with a preferred embodiment of the present invention. In this example, code 1600 contains the main loop and different routines described in FIGS. 9-15. Code 1600 is an example of pseudo-code for implementing a low-level console using a JTAG interface on the host side.

Partial output flush uses some of the same resources in the client as the memory read and write commands. This is distinguished on the host because a read or partial poll is only generated in direct response to a host request. However, since the client is allowed to fill its output data register with a full word of data from any channel at any time, the common check_incoming (to host) routine is called. It is assumed the acceptance of data from the client to the host display such as virtual channels 322, 324, and 326 in FIG. 3 of the driver is not dependent on the processing of data being sent to the client. The main loop of FIG. 9 is stalled while the debug read/write is in progress because a write command requires a prior read to set the saved address without an intervening poll or read.

The auto-increment of the saved address, such as saved address 450 in FIG. 4 in the execution of the write command 604 in FIG. 6 is an optimization to allow a contiguous block of memory to be written without the overhead of an additional read command. Overhead is further reduced by remembering the contents of the host data register and only writing it when needed.

For the purpose of reducing entry points, check_outgoing and try_flush can be folded into the main loop. Push_one, check_pending, and check_incoming are called from both the memory read/write routines directly and from the loop.

Thus, the present invention provides an improved method, apparatus, and computer instructions for a console interface. The mechanism of the present invention uses a low-level console, which is a console that does not require access to data processing system components, such as I/O subsystems, adapters, or serial ports connected to the I/O subsystem. Instead, the low-level console provided by the mechanism of the present invention uses a serial bus that is present on a processor or processor core. In this manner, the low-level console of the present invention may be used even when a number of systems in the data processing system have failed.

Typically, a serial interface such as a JTAG interface is one of the first components to be active and one of the last components to fail. As a result, access to the operating system may occur at an earlier time. Further, access to the operating system also may occur when many components have failed due to some error in processing or failure of hardware in the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for interfacing with an operating system on a client computer system, the method comprising:
   connecting, using a data link, a host computer system directly to a processor core that is located in a processor chip in the client computer system, said host computer system separate and remote from said client computer system;
   the data link not requiring a connection to an input/output (I/O) subsystem component, an I/O controller, or I/O bridge in the client computer system;
   the data link including a service bus controller that is external to the client computer system, the host computer system communicating with the service bus controller using an Ethernet connection, the service bus controller communicating with the client computer system using a JTAG interface;
   allocating unused, JTAG-accessible registers in the processor in the client computer system to use as console registers for providing a low-level console interface to the host computer system, the registers located on the processor chip;
   including a 64-bit host output data word register, a 64-bit client output data word register, a client output register, and a host request register in the console registers;
   using the host output data word register by the host computer system to send data to the client computer system;
   using the client output data word register by the client computer system for storing data to send to the host computer system;
   assigning a plurality of client channels to a main memory in the client computer system;
   including a plurality of virtual channels in the host computer system;
   providing, by said plurality of client channels, data to said console registers;
   including a plurality of pairs of input and output buffers in the main memory of the client computer system;
   associating each one of said plurality of pairs of input and output buffers with a different one of the plurality of client channels;
   including, in said client output register, a separate bit for each one of the plurality of client channels;
   including, in said host request register, a separate select channel bit for each one of said plurality of client channels;
   transforming client bits in said client output register by: said client computer system setting said client bits and said host computer system clearing said client bits;
   transforming host bits in said host request register by: said host computer system setting said host bits and said client computer system clearing said host bits;
   a first one of said plurality of client channels producing first data;
   placing said first data in one of said plurality of output buffers that is associated with said first one of said plurality of client channels;
   setting said separate bit that is included in said client output register for said first one of said plurality of client channels;
   writing said first data to said client output data word register;
   wherein when said client output data word register includes first data, using said client bits to identify said first one of said plurality of channels that sent said first data;
   displaying said first data; and
   when said host output data word register includes second data, using said host bits to identify one of said plurality of channels to which to send said second data.

2. The method of claim 1, wherein the service processor writes and reads the control registers.

3. The method of claim 1, wherein the control registers include a first register written by the processor and read by the host computer system; a second register written by the host computer system and read by the processor, a first control register written by the processor and cleared by the host computer system, and a second control register written by the host computer system and cleared by the processor.

4. The method of claim 3, wherein the first register and the second register are each a word sized register.

5. The method of claim 1, wherein the control registers are used to provide exchange of data through said plurality of virtual channels.

* * * * *